July 1, 1969
E. J. DZENIS
3,452,508
CASING MACHINE
Filed Oct. 13, 1966
Sheet 1 of 8
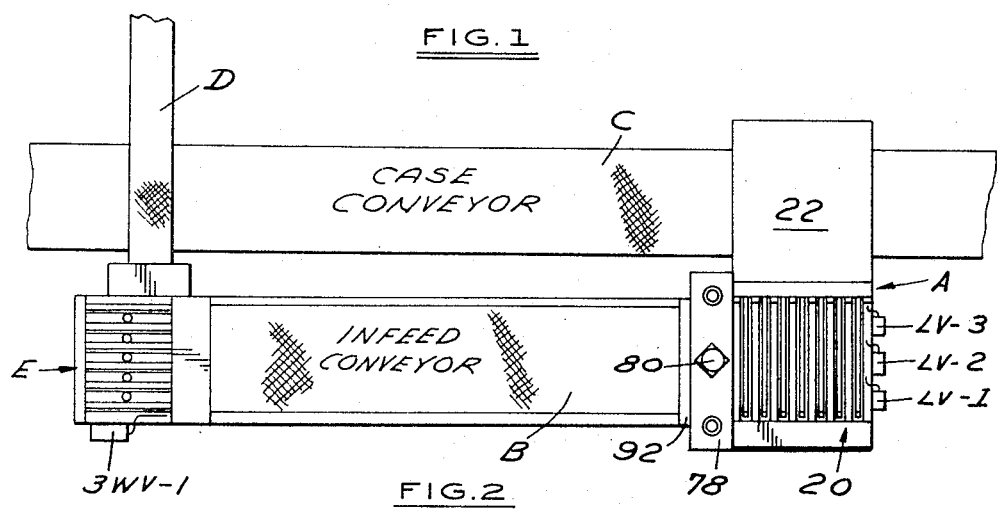
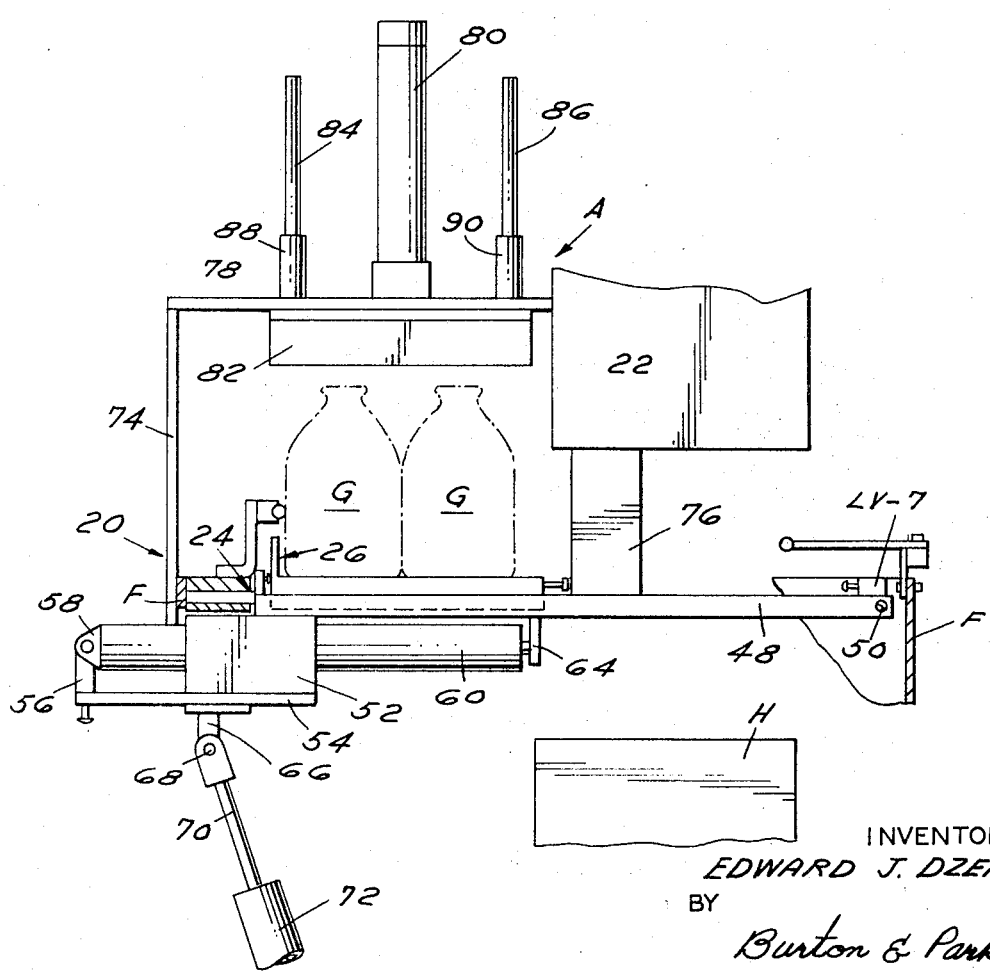
INVENTOR
EDWARD J. DZENIS
BY
Burton & Parker
ATTORNEYS

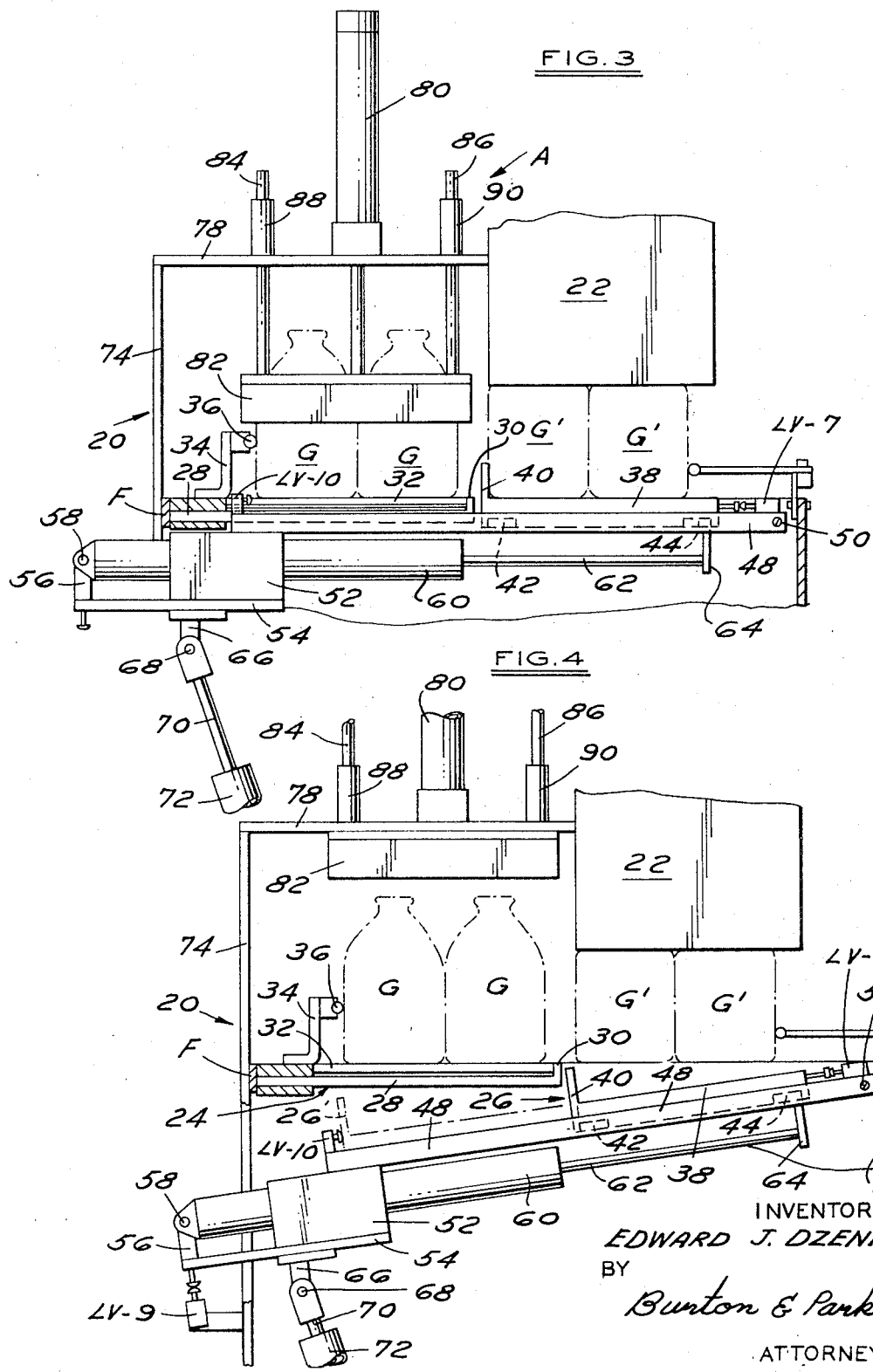

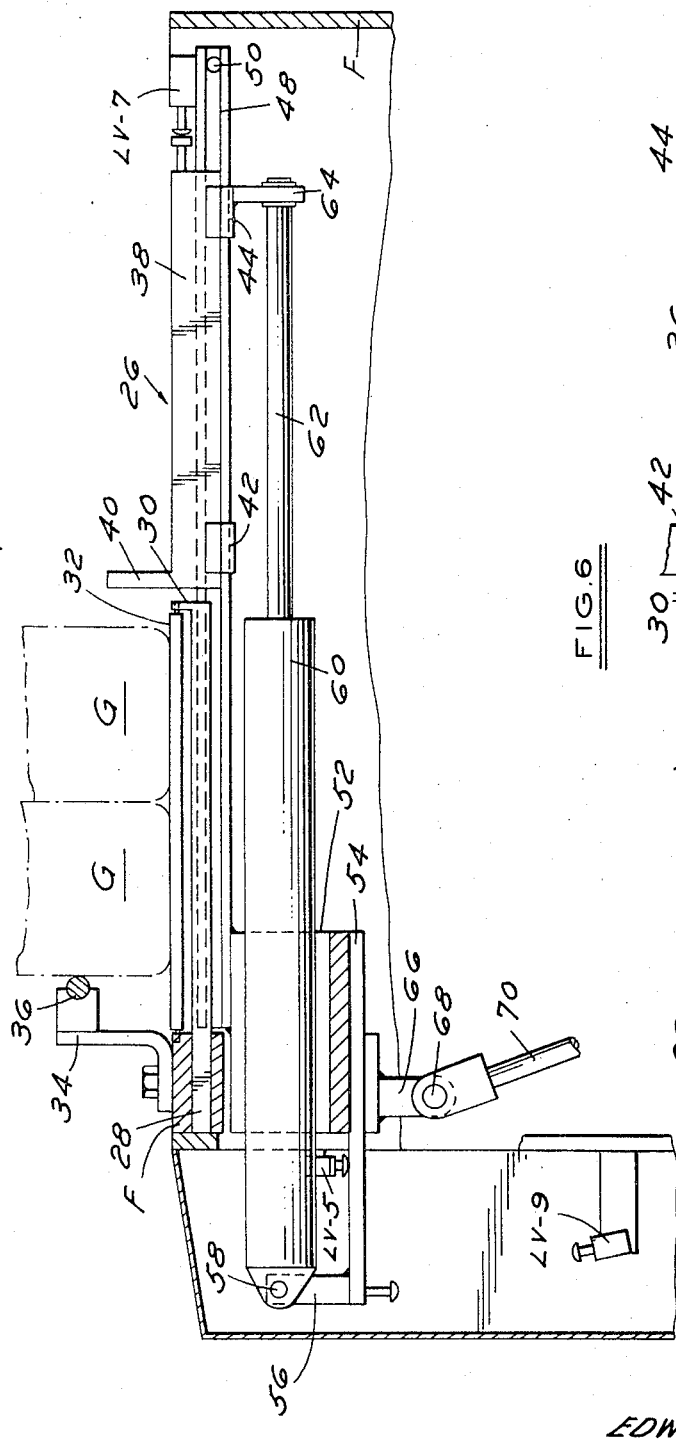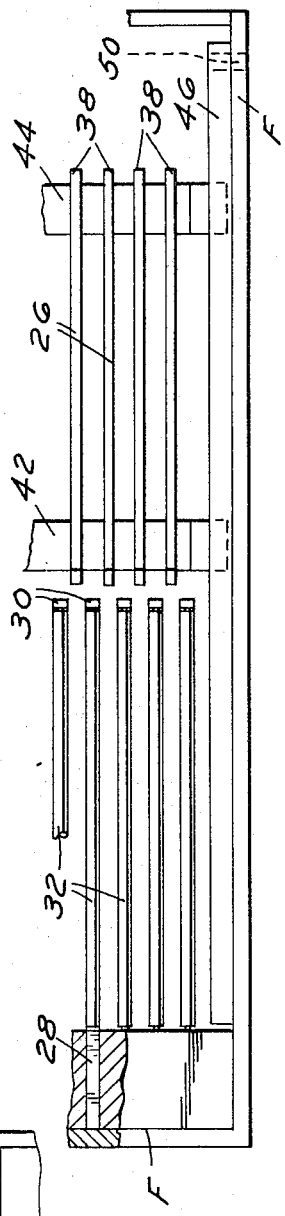

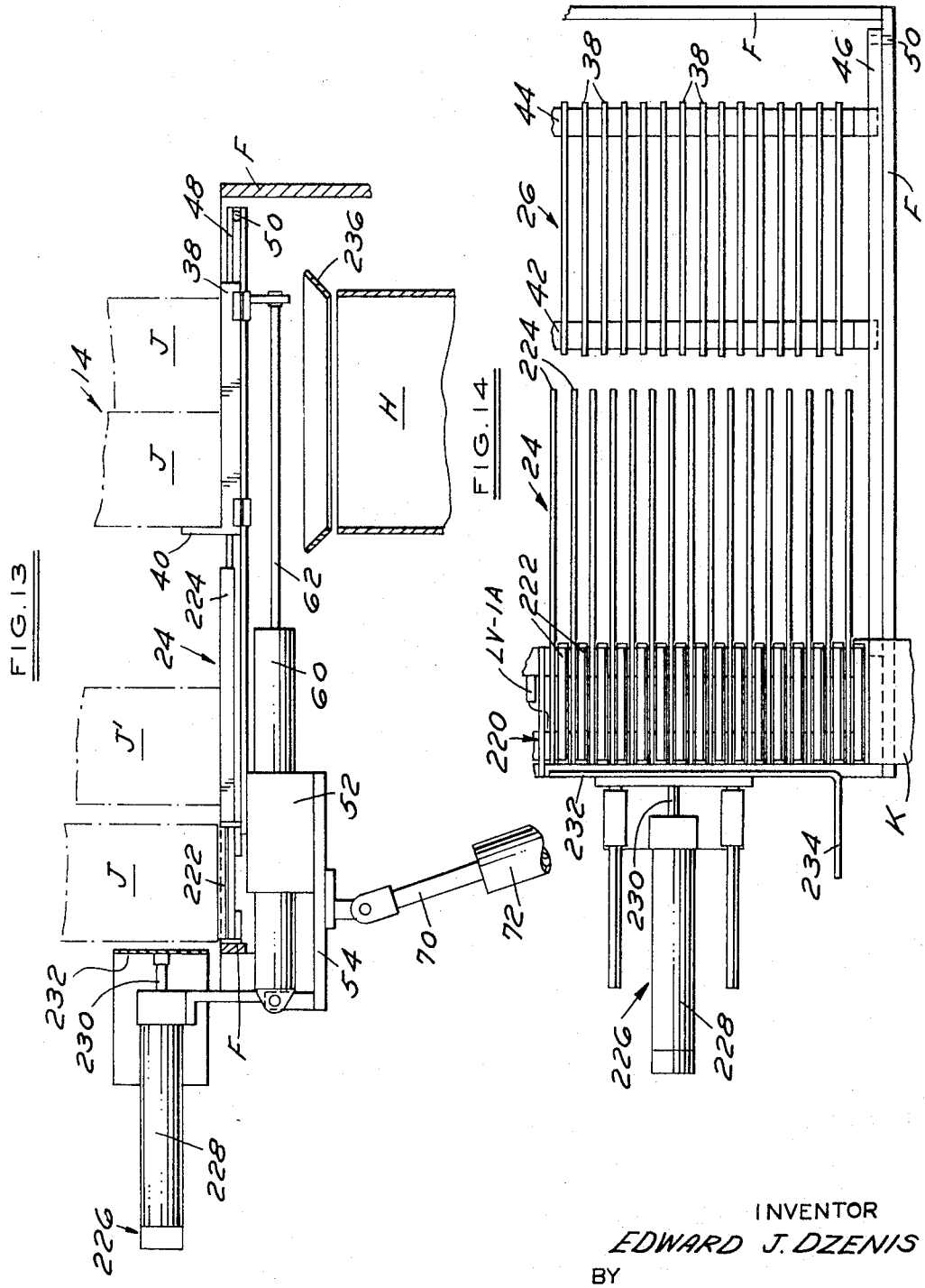

United States Patent Office 3,452,508
Patented July 1, 1969

3,452,508
CASING MACHINE
Edward J. Dzenis, 428 Bridge Road,
Northampton, Mass. 01060
Filed Oct. 13, 1966, Ser. No. 586,409
Int. Cl. B65b 21/06, 21/18
U.S. Cl. 53—48                                  8 Claims

ABSTRACT OF THE DISCLOSURE

A machine for automatically filling cases or crates with articles, specifically milk bottles, cartons or the like wherein a full caseload of bottles is accumulated in an accumulating station comprising stationary and movable support means, the movable support means being laterally shiftable out of the station to a bottle carrier and thereafter in a return movement back to the accumulating station in a path which will not interfere with the entry of additional articles onto the stationary support, whereby an additional caseload of bottles may be accumulated in the station on the stationary support during transfer movement of the movable support and deposit of a preceding caseload of bottles in a case or crate by the bottle carrier.

---

This invention relates to article-handling apparatus and more particularly to a machine for automaticaly filling cases or crates with bottles or the like. While the term "bottle" is used in the specification, it is to be understood that such term as used herein is intended as a generic expression covering containers made out of glass, paper, plastic, metal or the like, which contains foodstuffs, beverages, or any other substance desired to be so packaged. Conventional milk bottles and milk bottle cases or crates have been shown in the illustrative embodiment of the invention, but it is to be understood that they are shown by way of example only and the machine may be adapted to handle other types of containers without departing from the spirit of the invention.

The invention is embodied in a machine which is adapted to receive a continuous succession of bottles and bottle cases and to automatically deposit the requisite number of bottles into each bottle case.

It is a primary object of the invention to provide a bottle casing machine adapted to receive along one conveyor a succession of bottles and at the same time to receive along a second conveyor a succession of cases, and to transfer the bottles from the bottle conveyor to the cases on the case conveyor. Consistent with this objective, an outstanding feature of the invention is the provision of a machine capable of depositing the bottles within the cases at a much faster rate than with prior machines, and at the same time keeping machine speed within certain limits to insure long machine life and eliminate bottle breakage during the casing operation.

Another object is the provision of a machine of the character described employing novel bottle transfer mechanism for transferring bottles from the bottle conveyor to the cases on the case conveyor, whereby during transfer movement of one caseload of bottles to an awaiting case, the next successive caseload of bottles enters the machine in proper position for transfer during the time period that the first caseload is being deposited within its respective case.

Another object is the provision of an improved bottle carrier for gripping the bottles and transporting them to an awaiting case, which carrier may be quickly and easily removed from the machine and replaced by another similar carrier adapted to handle different size bottles.

A further object is the provision of an improved case positioning mechanism which positively aligns each successive case in proper position to receive bottles from the bottle carrier.

Other objects, advantages, and meritorious features will more fully appear from the specification, claims, and accompanying drawings, wherein:

FIG. 1 is a top elevation, in somewhat schematic form, showing a bottle packaging machine embodying the invention and also showing the general arrangement of the bottle and case conveyors and their relationship to the machine;

FIG. 2 is a partial end elevation of the bottle packaging machine of FIG. 1, showing bottles entering the machine;

FIG. 3 is an end elevation similar to FIG. 2 showing the machine in another stage of its operation;

FIG. 4 is an end elevation similar to FIGS. 2 and 3 showing the machine in still another phase of operation;

FIG. 5 is an enlarged elevation similar to FIG. 2 showing details of construction;

FIG. 6 is a partial top elevation looking in the direction of the arrow 6 in FIG. 5;

FIG. 13 is a view similar to FIG. 5 showing a machine adapted to handle paper cartons or the like;

FIG. 14 is a top elevation looking in the direction of the arrow 14 in FIG. 13.

Figure 7:
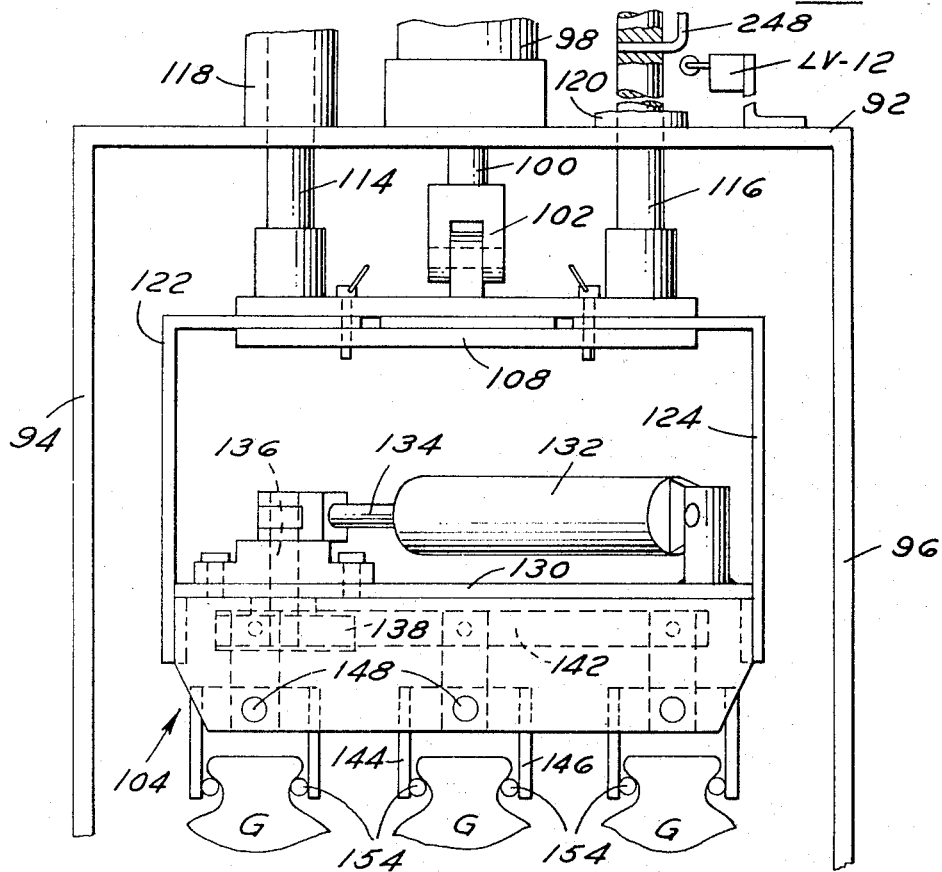
FIG. 7 is a side elevation showing the construction of the bottle carrier of the machine.

Referring now more particularly to the drawings, there is shown generally at A a casing machine embodying the invention to which filled containers such as bottles are delivered by continuously fed infeed conveyor B, while empty cases or crates are fed to the machine along continuously driven case conveyor C. A single line bottle conveyor is shown at D along which bottles are delivered from a filling and capping machine (in the case of milk bottles) to a transfer mechanism E. The general operation of the apparatus shown in FIG. 1 is as follows: Bottles fed in a single line along conveyor D enter the transfer mechanism E, and when a sufficient number of bottles to form a case row have accumulated therein, the transfer mechanism E transfers a row of bottles onto the infeed conveyor B, which delivers them to the casing machine A. Upon the accumulation of a full caseload of bottles and the delivery of an empty case along case conveyor C to the machine, the casing machine A operates automatically to transfer a caseload of bottles to an awaiting case.

The casing machine A in general comprises a bottle accumulating and transfer station 20 and a bottle carrier 22. The accumuating and transfer station 20 is disposed in bottle-receiving relation with infeed conveyor B, while the bottle carrier 22 is disposed in vertical register with a case-supporting station to be described hereafter on the case conveyor C. The casing machine A is supported on a suitable frame F upstanding from the floor, and as the frame F is of conventional construction its component parts have not been shown in detail for simplicity of illustration.

In FIGS. 2 through 6 there is shown details of construction of the accumulating and transfer mechanism 20. Such comprises in general a stationary bottle supporting member 24 and a movable bottle supporting member 26. Member 24 comprises a plurality of narrow elongate cantilever members 28 fixedly connected to a portion of the frame F at one end and each having an upstanding flange 30 at its opposite end. Rotatably mounted on each member 28 is an elongate roller rod 32 upon which the milk bottles or the like G are supported in the station preparatory to transfer movement. Upstanding from the frame member F on the side of the transfer station opposite the bottle carrier 22 is an L-shaped bracket 34 which carries a longitudinally extending guide rail 36 positioned to insure proper lateral alignment of the bottles G within the station 20.

The movable bottle supporting member 26 comprises a plurality of thin, elongate support members 38 having upstanding end pusher portions 40 at the ends thereof remote from carrier 22 as shown in FIG. 2. The members 28 and 38 are arranged in uniformly spaced-apart relation as shown most clearly in FIG. 6, so that when the mechanism is in the position shown in FIG. 2, the members 38 are interleaved between the members 28. Also, the upper surface of the members 38 and the upper surface of the rollers 32 are disposed in a common plane so that the bottles G are supported by all of the members when in the position as shown in FIG. 2.

The members 38 are fixed in uniformly spaced-apart relationship to a pair of transverse support bars 42 and 44 which are in turn supported for slidable longitudinal movement at their opposite ends in a pair of elongate rails 46 and 48. The rails 46 and 48 are pivotally secured to the frame F adjacent one end as by pins 50 and are secured as by welding adjacent their opposite ends to an upstanding plate 52 to be described. A generally horizontal plate-like member 54 has welded thereto upstanding support 52 and also an upright block 56 to which is pivotally connected as at 58 a fluid pressure cylinder 60 provided with an extendible piston rod 62, the outer end of which is connected to a block 64 depending fixedly from the support bar 44 as shown most clearly in FIG. 5. Depending from plate 54 is a block 66 to which is pivotally connected as at 68 the extendible piston rod 70 of a second fluid pressure cylinder 72. The opposite or lower end of the cylinder 72 (not shown) is suitably pivotally connected to a portion of the frame F.

Fixed to the frame F at the entrance to the accumulating and transfer station 20 are a pair of upright members 74 and 76 surmounted by a horizontal plate 78 supporting a fluid pressure cylinder 80, the piston rod of which is coupled to a vertically shiftable stop-gate member 82. A pair of guide rods 84 and 86 fixed to the gate member 82 extend upwardly through bushings 88 and 90 on plate 78 to guide the gate 82 in its vertical movement. The gate 82 is so positioned that when lowered by the actuation of the fluid pressure cylinder 80, it is interposed between the last row of bottles in the caseload positioned in station 20 and the next row of bottles delivered by the infeed conveyor B. A dead plate 92 is interposed between the downstream end of conveyor B and the station 20, and the leading row of bottles withheld by gate 82 when in its lower position are resting upon dead plate 92.

When a caseload of bottles have been accumulated in the station 20, the control system to be later described causes actuation of the fluid pressure piston cylinder 80, lowering the gate 82 to prevent movement of additional bottles from the infeed conveyor B to the station 20. When the gate 82 is lowered, the piston rod 62 of cylinder 60 is extended, carrying the movable support 26 from the position shown in FIG. 2 to the position shown in FIG. 3, thus transferring a caseload of bottle from the station 20 to a position under the bottle carrier 22. When the bottles G have been gripped by the gripping mechanism in carrier 22, to be described, fluid pressure cylinder 72 is actuated, retracting piston rod 70, and pivoting the entire movable mechanism about the pivots 50 to the position as shown in FIG. 4. Piston rod 62 of cylinder 60 is then retracted, moving support 26 to the left as shown in FIG. 4 until when in its fully retracted position subjacent stationary support 24, at which point piston rod 70 of cylinder 72 is extended to bring the portions 24 and 26 into register completing a cycle of operation. As can be seen from FIGS. 3 and 4, as soon as the first caseload of bottles has been transferred to the position under the carrier 22 as shown at G' in FIG. 3, the stop-gate 82 is raised, allowing successive bottles G to enter the station 20 forming another caseload awaiting transfer. Thus a successive caseload of bottles is accumulated in the station 20 as soon as the previous caseload has been transferred to the carrier 22, because the movable transfer table 26 is returned to its initial position in a path underneath the fixed table portion 24, so as not to interfere with the bottles being accumulated in station 20.

Figure 8:
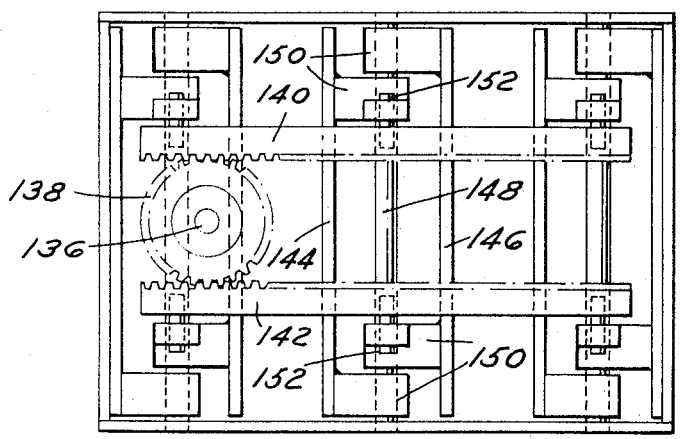
FIG. 8 is a top elevation of the bottle carrier shown in FIG. 7.

Turning now to FIGS. 7 and 8, there is shown in some detail the construction of the bottle carrier 22. The carrier mechanism is supported on a horizontal support member 92 which rests at its opposite ends and is secured to two upright supports 94 and 96 which form a part of the frame half of the machine. Mounted atop member 92 is a fluid pressure cylinder 98 having a downwardly projecting extendible piston rod 100 provided with a clevis 102 at its lower end. A bottle gripping mechanism generally indicated at 104 is suspended from the cylinder piston rod by a pair of spaced plates 106 and 108 retained in their spaced-apart relation by a spacer block 110 welded thereto, an upstanding block 112 welded to plate 106 being pivotally connected to clevis 102 to support the mechanism. A pair of guide rods 114 and 116 are secured to plate 106 and project upwardly through bushings 118 and 120 mounted on member 92 to guide the mechanism in its vertical movement.

A pair of inverted L-shaped brackets 122 and 124 have their base portions fixed to the carrier 104, and each has a leg portion extending between spaced plates 106 and 108 and supported by the latter to suspend the mechanism 104 therefrom. A pair of pins 126 and 128 extending through members 106, 108 and the brackets 122 and 124 secure the mechanism 104 in place and prevent lateral shifting thereof during operation. As the machine is designed to handle different sizes and shapes of containers, the unit 104 may be easily removed from the machine and replaced by a similar unit designed to handle different sized containers by merely removing the pins 126 and 128, sliding the entire unit 104 out of the machine, and replacing it with a similar unit.

Unit 104, which might be termed the carrier "head," comprises an upper plate-like member 130 atop which is mounted a fluid pressure cylinder 132 having a piston 134 connected to a vertical stub shaft 136 which extends through the plate 130. Reciprocation of the piston rod 134 imparts limited rotative movement to the shaft 136. Fixed on the lower end of the shaft 136 is a spur gear 138 the teeth of which mesh with a pair of spaced rack gears 140 and 142. Pivotally mounted in the head 104 are a plurality of spaced-apart gripper jaws, each pair of which is adapted to grip a bottle G therebetween. As the pairs of jaws are identical, only one pair will be described in detail, such description serving for all of the jaws. It will be apparent that as many pairs of jaws may be provided in the head 104 as there are rows of containers to fill an empty case.

Each pair of bottle grippers comprises two generally vertically disposed gripper jaws 144 and 146 pivotally connected to a shaft 148 by means of bearing blocks 150 adjacent opposite ends of each jaw. Of the two blocks 150 supporting each jaw, one is provided with an aperture through which a pin 152 projects, the opposite end of the pin being received within one of the rack gears 140 or 142. Upon rotation of spur gear 138, the rack gears 140 and 142 are caused to move through limited distances in opposite directions, causing each set of gripper jaws 144 and 146 to move toward and away from each other to grip and release a bottle G disposed therebetween. Adjacent their lower marginal edges, the gripper jaws 144 and 146 are provided with a rod-like element 154, preferably made out of nylon or some similar material, said elements cooperating to grip the neck of a bottle G disposed therebetween when the gripper jaws are moved to their gripping position.

Figure 9:
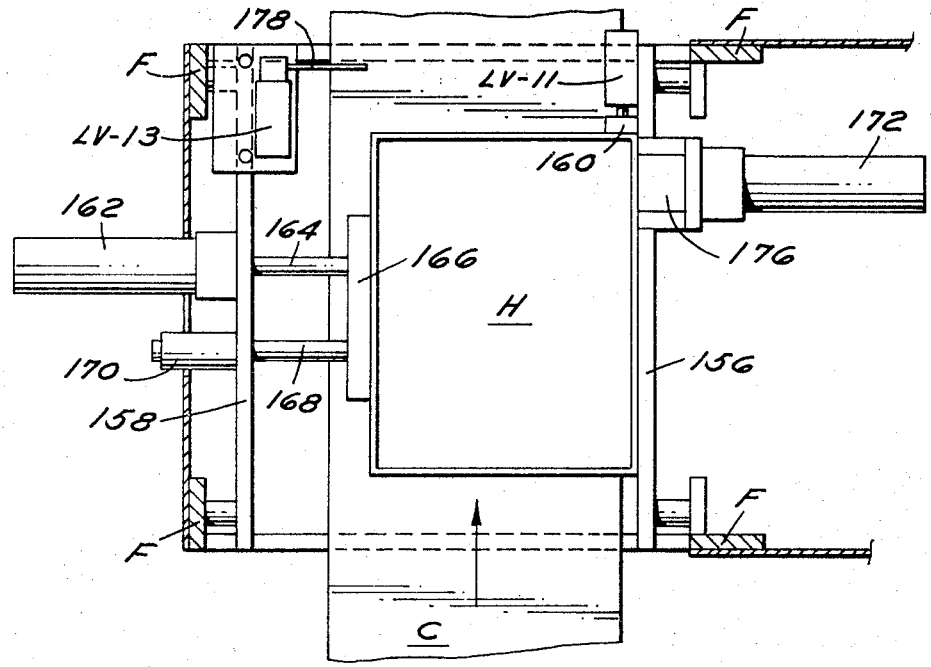
FIG. 9 is a top elevation of the case positoning mechanism, showing a case in position for deposit of bottles therein.
Figure 10:
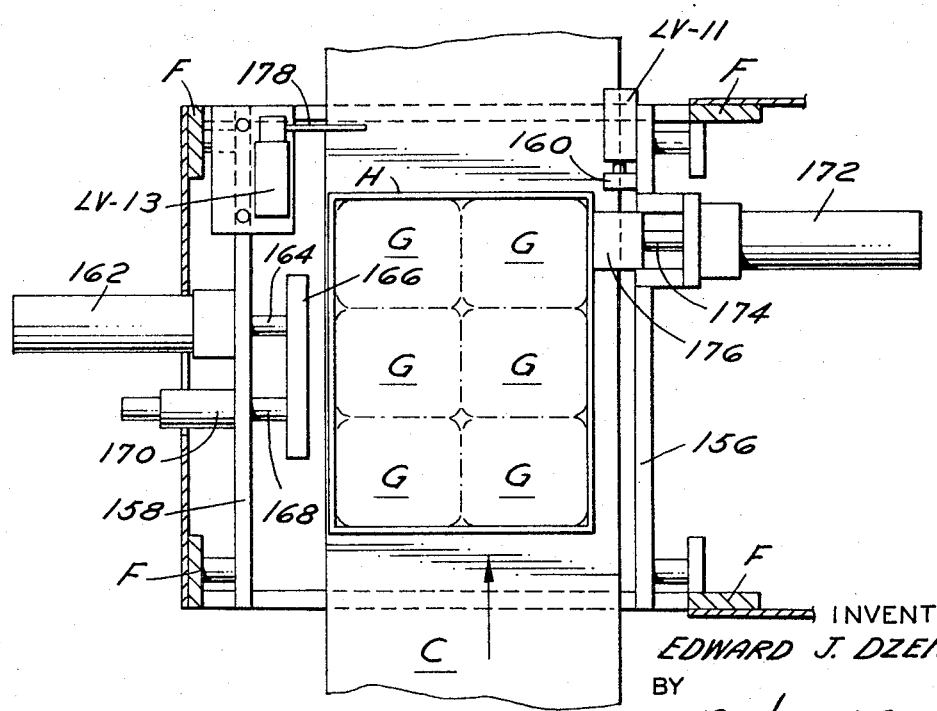
FIG. 10 is a top elevation similar to FIG. 9 showing a filled case ready for departure from the machine.

Shown in FIGS. 9 and 10 is the case-positioning mechanism which is disposed in vertical register with the bottle carrier previously described to position an empty case in proper alignment on the case conveyor C to receive a caseload of bottles deposited therein by the carrier. The case-positioning mechanism is supported at its four corners on the machine frame members generally indicated at F. Secured to the frame members F on opposite sides of the case conveyor C and extending generally longitudinally thereof are a pair of rigid bars 156 and 158 upon which is mounted the case-positioning mechanism. As shown in FIG. 9, when an approaching case moving along the case conveyor C in the direction of the arrow enters the case-positioning station, the leading edge of the case H abuts the block 160 of a fluid pressure limit valve LV–11, actuating the limit valve as hereinafter described, and also serving as a positioning stop for the leading edge of the case H. Horizontally mounted on bar 158 is a fluid pressure cylinder 162 having an extendible piston rod 164 provided with a clamping bar 166 at its outer end, which bar has a guide rod 168 projecting therefrom and extending through a guide bushing 170 fixed to the bar 158. Upon actuation of limit valve LV–11, the control system to be described actuates cylinder 162, extending piston rod 164 to bring bar 166 into clamping contact with the case H entrapping the case between the bar and the bar 156, and holding the case in proper bottle-receiving position.

Turning to FIG. 10, there is provided immediately adjacent valve LV–11 a fluid pressure cylinder 172 having an extendible piston rod 174 surmounted by a block 176. Such is commonly referred to as the "case picker" mechanism and operates as follows: When a caseload of bottles G has been deposited in the awaiting case H, the case clamp cylinder 162 is reversely pressurized, retracting clamp 166 from the case, and cylinder 172 is pressurized, extending piston rod 174 and its block 176 to push the case laterally on the case conveyor to the position shown in FIG. 10, releasing the case from abutment with the block 160, and allowing the filled case to pass along case conveyor C out of the machine. Limit valve LV–13 is positioned as shown, having an actuating arm 178 projecting into the path of the departing case, actuating valve LV–13 as the case passes out of the machine, signalling the control mechanism that such has occurred, as hereinafter more fully described.

Figure 11:
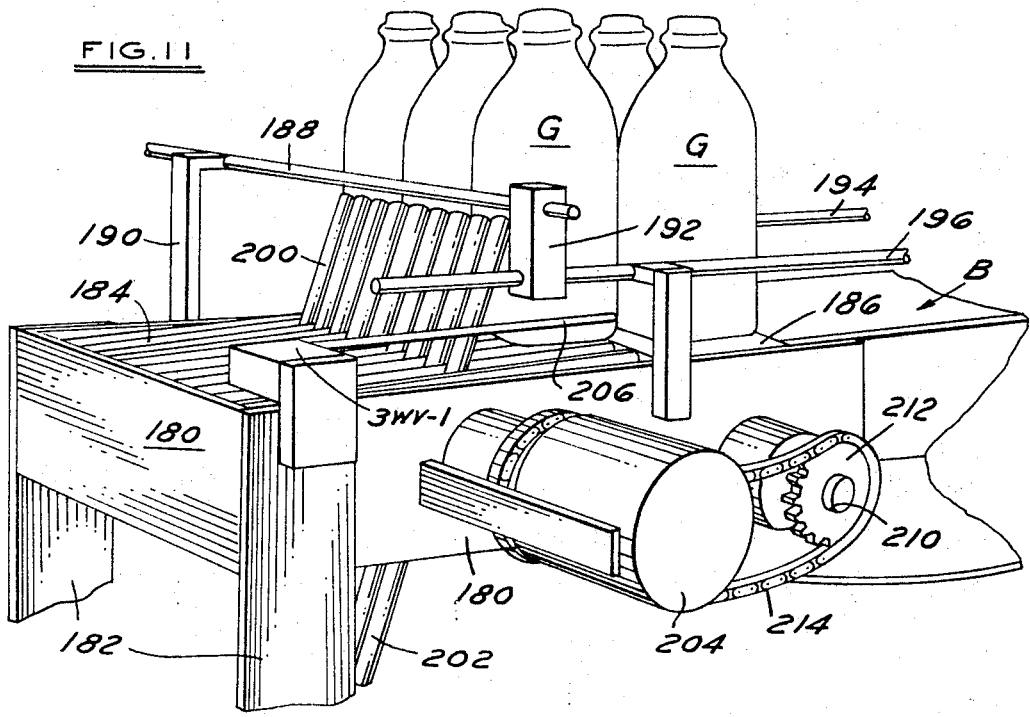
FIG. 11 is a perspective view of the bottle-accumulating mechanism.
Figure 12:
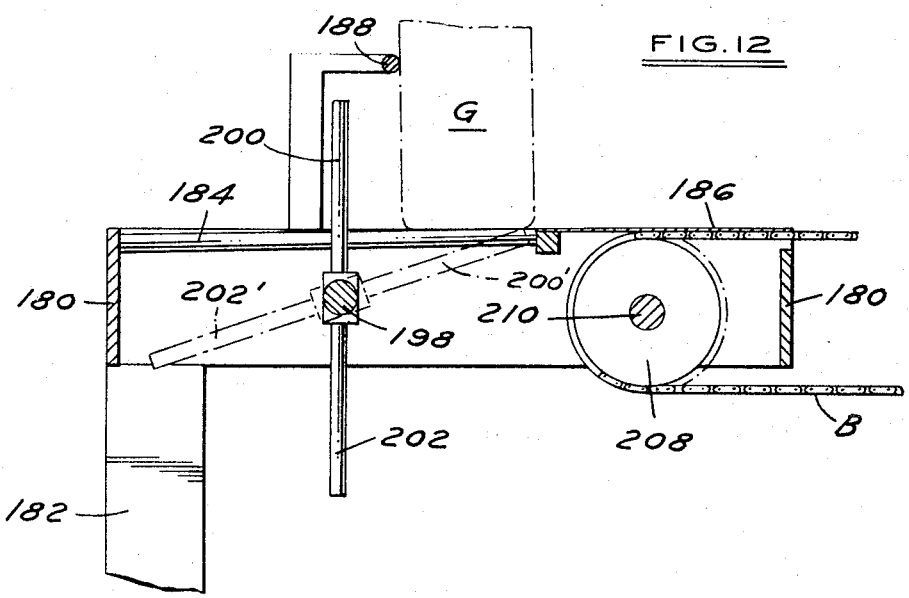
FIG. 12 is a side elevation, partly in section, of the mechanism shown in FIG. 11.

Shown in FIGS. 11 and 12 are details of construction of the bottle transfer unit E, which is operable to transfer rows of bottles from the conveyor D to the infeed conveyor B (FIG. 1). The unit E comprises a generally rectangular frame 180 supported spaced above the floor by upright members 182. Supported on the frame members 180 is a series of uniformly spaced-apart elongate rollers 184, and between such rollers and the upstream end of the infeed conveyor B, a plate-like stationary member 186. A guide rail 188 mounted on supports 190 and 192 extends across the roller bed 184 substantially centrally thereof to guide the bottles G into the transfer area, and additional guide rails 194 and 196 extend along opposite sides of the infeed conveyor B to guide the rows of bottles during their movement therealong. Horizontally mounted under the roller bed 184 and spaced slightly rearwardly of guide rail 188, there is provided a shaft 198 to which are fixed two series of pusher rods 200 and 202, the two series being positioned diametrically opposite each other. Each series of rods is arranged so that the individual pusher rods are spaced to project upwardly between the rollers 184 when the shaft 198 is rotated. As shown in FIG. 12, when a row of bottles enters the transfer area the first series of rods 200 operates to push the row of bottles in the transfer area from the rollers 184 onto the stationary plate 186. As soon as the pusher 200 has reached the position shown in phantom at 200', an additional row of bottles may move into the transfer area, while the pusher continues its rotation to bring the pusher members shown at 202 and 202' into the upright position ready to push the next row of bottles. The pusher rods 200 and 202 are sized to contact the bottles G below their center of gravity, so that there is no possibility of tipping a bottle during the pusher movement. This unique pusher operates to comparatively gently urge the bottles from the roller bed 184 onto the plate 186, obviating the incidence of bottle breakage as is the case with prior pusher designs. In addition, as a new row of bottles may enter the transfer area on roller bed 184 as soon as the pusher has travelled through an angle of rotation substantially less than 90 degrees, the pusher operates much more quickly and efficiently than prior designs to keep a steady supply of bottles fed to the infeed conveyor B.

To rotate the shaft 198 and pusher members 200 and 202, there is provided a fluid pressure operated clutch 204 which is coupled to a valve 3WV–1, the valve having an actuating arm 206 projecting into the path of bottles G entering the transfer area so that when a row of bottles is fully positioned within the transfer area, the forwardmost bottle strikes arm 206, opening valve 3WV–1, to engage clutch 204. Continuous infeed conveyor B is entrained over a sprocket 208 and is driven from a suitable electric motor (not shown). Sprocket 208 is mounted on a shaft 210 which extends beyond the conveyor B and is provided with a second sprocket 212 over which is entrained a continuous chain 214. The chain 214 is also entrained over a similar sprocket on the clutch 204 and thus the mechanism is continuously driven by the same power source that drives infeed conveyor B, engagement of the clutch 204 by opening of the valve 3WV–1 operating to rotate the shaft 198 and move the pusher members 200 and 202 180-degrees to push a row of bottles G onto the plate 186. The following row of bottles can immediately enter the transfer area, and as such row of bottles is pushed onto the plate 186, the first row of bottles is urged onto the infeed conveyor B for delivery to the casing machine A.

In FIGS. 13 and 14 there is shown a slightly modified construction for the casing machine A, such differing from the construction already described in that the machine is adapted to handle a single line of containers J, rather than the rows of containers G as indicated in FIG. 5 for example. The containers J may be of any suitable construction, but the machine is particularly adapted for handling paper containers filled with dairy products such as milk or the like. Instead of being fed by the multiple row infeed conveyor B already described, the machine of FIGS. 13 and 14 is fed by a single line conveyor K to the machine. The same reference numerals have been used in FIGS. 13 and 14 to indicate parts corresponding to the previous description, and reference to FIGS. 5 and 6 will serve to illustrate the similarity of structure. Communicating in article-receiving relation with the conveyor K is an article-receiving station 220 which includes a series of closely spaced rollers supported for rotation on the machine frame F. A single line of the containers J are accumulated on the rollers 222 as they are fed from the conveyor K into the station. A series of uniformly spaced-apart supporting bars 224 are positioned similarly to the roller members 32 as shown for example in FIGS. 5 and 6, and serve the same function as such roller members, that is, they provide supporting structure for a caseload of the containers J which are to be transferred into an awaiting case shown at H. The movable transfer unit 26 is identical in construction to that shown in the previous figures of the drawings, and is arranged in the same relationship to the stationary members 224 as previously set forth.

When the line of containers J enters the area 220, the leading container contacts limit valve LV–1a, which actuates a transfer mechanism generally indicated at 226 to transfer the line of containers from the area 220 to the area 24. The transfer member 226 comprises a fluid pressure cylinder 229 having a piston rod 230 projecting therefrom to the forward end of which is affixed a pusher plate 232, pressurization of the cylinder extending the piston rod to shift the pusher through the area 220 to move a line of containers from the rollers 222 to the position shown at J' in FIG. 13. A rearwardly extending portion 234 of the pusher 232 prevents entry of more containers J during the transfer movement. Upon retraction of the pusher 232, another line of containers J enters the area 220 in front of the pusher, actuating valve LV–1a, which initiates another transfer movement. When a caseload of bottles has been accumulated in the area 24 resting upon the bars 224, the movable transfer member 26 is caused to operate in exactly the same fashion as the transfer unit previously described and shown for example in FIGS. 5 and 6 to transfer a caseload of containers under the carrier 22. As the containers J are compacted together for deposit into the case H, and as the paper walls of such containers have a tendency to bulge when filled with liquid, such as milk or the like, a baffle member 236 is positioned in vertical registry with the case H and immediately thereabove to guide the lower end of the containers J into the case.

*Operation*

The operation of the apparatus shown in FIGS. 1–12 will now be described by reference to the schematic diagram FIG. 15. It is to be understood that essentially the same operation cycle is used for the machine shown in FIGS. 13 and 14 with the minimal changes required with the provision of the transfer pusher 226.

Figure 15:
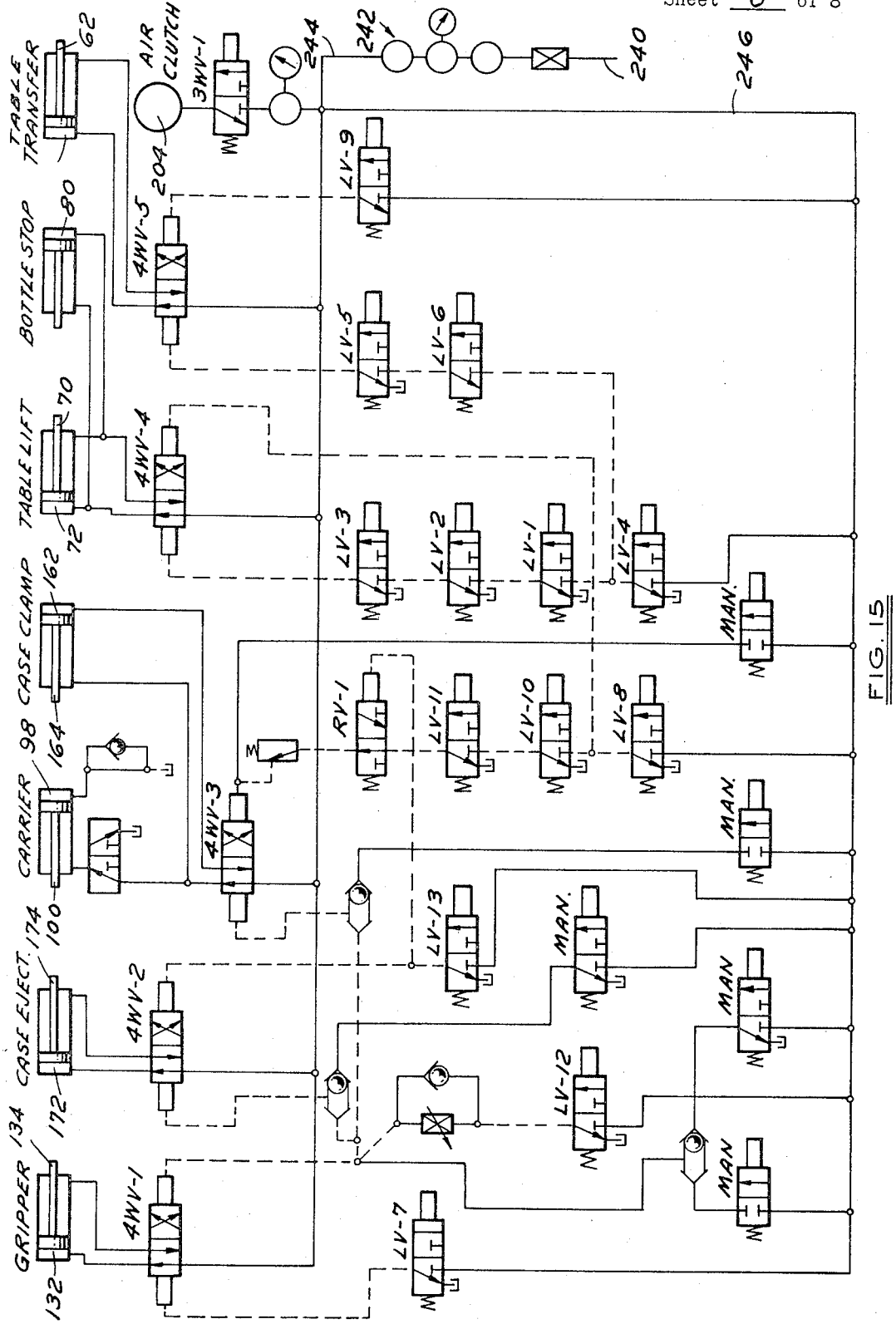
FIG. 15 is a schematic diagram of the fluid pressure lines of the machine.

Supply air or other fluid under pressure is delivered to the machine control circuit shown in FIG. 15 through a line 240, and passes through a filter, pressure regulator, and lubricator, as is common practice, which devices are indicated generally by the reference numeral 242. The control system will be described using air as the actuating medium, but it will be understood that the system could be an hydraulic system, or that electrical controls could be used. Air is supplied through a supply line 244 to a series of four-way valves which operate to control the supply of air to the various piston-cylinder assemblies previously described and shown in the various other figures of the drawings, and which are illustrated schematically across the top of FIG. 15. These four-way valves are indicated by the reference characters 4WV–1 through 4WV–5 inclusive, and their operation will become apparent as the description proceeds. Line 244 also supplies air under pressure to valve 3WV–1, which controls the air clutch 204 to actuate transfer mechanism E.

Assuming that the system is in readiness to operate, with line 244 being supplied with air under pressure, and conveyors B, C and D being continuously driven by suitable means such as electric motors (not shown), a line of bottles is conveyed from a filling machine or the like along conveyor D to the transfer mechanism E (FIG. 1). When the first bottle in the line shifts arm 206 (FIG. 11) valve 3WV–1 is actuated, supplying pressure air to air clutch 204 and rotating rods 200 and 202 through substantially 180-degrees to push a row of bottles from the rollers 184 onto the dead-plate 186. This cyclical operation of the transfer mechanism continues, with each successive row of bottles pushed onto the dead-plate 186 in turn urging a preceding row of bottles onto the infeed conveyor B. Because of the unique design of the transfer mechanism, immediately upon one row of bottles being pushed onto dead-plate 186, the next row of bottles may enter into the transfer area without delay. As the rows of bottles G move along the conveyor B they pass under the bottle stop-gate 82 which is maintained in its uppermost position (FIG. 2) by the cylinder 80, and are pushed by following bottles into the transfer area 20 of the casing machine A.

When a caseload of bottles is present in the transfer area 20, the first bottle in each row contacts the actuating arm of a limit valve LV–1, LV–2, and LV–3. Three of these limit valves are indicated because normally three lines of quart size bottles form a caseload. However, half gallon bottles have been shown as being handled by the machine, and as only two lines of half gallon bottles fill a normal case, limit valve LV–2 would be rendered inoperative as by depressing its actuating arm to hold the valve open. These three limit valves are in series with each other and with the gripper open limit valve LV–4 (FIGS. 8 and 9), and when all of these valves are open, pressure air through line 246 and the four open valves actuates valve 4WV–4, shifting such valve to deliver supply air to table lift cylinder 72 and bottle stop-gate cylinder 80 respectively. Table lift cylinder 72 then shifts to raise the transfer table 26 to the position shown in FIG. 2, while cylinder 80 shifts to lower bottle stop-gate 82 and prevent additional bottles from entering the transfer area 20.

Upward movement of the transfer table 26 actuates valve LV–5 (FIG. 5), and assuming the carrier is in its uppermost position, valve LV–6 is also open (FIG. 8) and as these two valves are in series, valve 4WV–5 is actuated, supplying air to cylinder 60 and extending its piston rod 62 to shift the transfer table from the position shown in FIG. 2 to the position shown in FIG. 3, thus transferring a caseload of bottles into the carrier 22 between the gripper jaws. When the transfer table reaches its forward limit of travel, valve LV–7 (FIG. 5) is actuated supplying air under pressure to valve 4WV–1, which in turn actuates gripper cylinder 132 (FIGS. 8 and 9) closing the gripper jaws to grip the caseload of bottles. Closing of the gripper jaws actuates limit valve LV–8 to reversely pressurize valve 4WV–4 which supplies air to table lift cylinder 72 and bottle stop cylinder 80, lowering table 26 and raising bottle stop-gate 82 to their positions shown in FIG. 4. Lowering of the table 26 and its connecting mechanism actuates limit valve LV–9 as shown in FIG. 4 which in turn reversely pressurizes valve 4WV–5 to cause the table transfer cylinder 60 to retract table 26 from underneath the carrier 22. When the table 26 reaches its rearward limit of travel, it actuates limit valve LV–10, which is in series with the gripper closed limit valve LV–8 and the case position limit valve LV–11. Also in series with these three valves is a normally open valve RV–1 which is a pilot activated valve and is controlled by the case exit limit valve LV–13 described hereinafter.

If a previously loaded case does not leave the casing machine, the case exit limit valve will remain activated sending air to the relay valve RV–1, closing that valve and preventing the actuation of valve 4WV–3 to in turn prevent the carrier from descending into the case with another load of bottles. Assuming valve RV–1 to be open (indicating the previous case has passed out of the machine), actuation of valves LV–8 (when the grippers are closed), LV–10 (when the table is fully retracted), and LV–11 (FIG. 9) (indicating a case in position), valve 4WV–3 is actuated exhausting air from cylinder 98 to cause the carrier 22 to descend by gravity and deliver a caseload of bottles into the awaiting case. Gravity descent of carrier 22 rather than under power softens the impact in the event a bottles strikes an obstruction in the case during lowering, and prevents bottle breakage. Actuation of valve 4WV–3 also pressurizes the case clamp cylinder 162, urging the case clamp member 166 to clamp the case in bottle-receiving position as shown in FIG. 9.

As the carrier moves downwardly and the bottles suspended therefrom reach a position where their bottoms are approximately four inches above the bottom wall of the case H, the normal release limit valve LV–12 (FIG. 7) is activated by a cam 248 fixed to rod 116 adjacent its upper end, and air is delivered to a time delay valve TDV–1. Expiration of the time period of TDV–1 reversely pressurizes gripper valve 4WV–1 to open the grippers, pressurizes the case eject cylinder 172 through valve 4WV–2 to eject the case, and also reversely pressurizes valve 4WV–3 to supply air to both the carrier lift cylinder and the case clamp cylinder, raising the carrier and retracing the case clamp 166. Recapitulating, the actuation of valve LV–12 (after the expiration of TDV–1) causes the following to occur: The gripper jaws 144, 146 are opened to release the bottles into the case, the case clamp 166 is released, the bottle carrier 22 is raised, and the case eject cylinder 172 is actuated to shift the filled case to its position as shown in FIG. 10 to pass along conveyor C out of the casing machine A. In the event downward movement of carrier 22 is interrupted, as by a bottle striking an obstruction in the case after valve LV–12 is activated by cam 248, TDV–1 will nevertheless time out, and 4WV–1 will be reversely pressurized to open the grippers and deposit the bottles in the case.

As shown in FIG. 10, as the case passes out of the machine it depresses actuating arm 178 of valve LV–13, actuating such valve, and reversely pressurizing valve 4WV–2 to retract case eject mechanism 172, and also to open valve RV–1, indicating that the case has passed from the machine. Upon the completion of a cycle of operation, the components of the casing machine A are positioned as indicated in FIG. 4, that is the transfer table has been shifted to its lowered and retracted position as shown in phantom at 26', the bottle stop-gate 82 is in its raised position, and the carrier 22 is also in its raised position. By the time a caseload of bottles has been deposited in the first case, and the carrier has returned to its upper position, another caseload of bottles G will have been accumulated in the transfer area 20, assuming that the filling machine or the like which is supplying bottles to the machine A is operating properly.

As can be seen from an examination of FIG. 15, forward movement of the transfer table actuates LV–7 to close the grippers, and as soon as the grippers are fully closed LV–8 is actuated to reversely pressurize valve 4WV–4, raising bottle gate 82 through cylinder 80. Thus as soon as the transfer table 26 has moved out of the transfer area 20 to its position under the carrier 22, and the bottles are gripped, bottle stop-gate 82 is raised so that the succeeding bottles may be accumulated in the transfer area 20 during the interval that the transfer table 26 is retracting, and the carrier 22 is depositing a caseload of bottles G' in an awaiting case. This feature of the machine appreciably speeds up the machine operation without increasing the speed at which any individual parts of the machine have to travel. Thus it accomplishes more efficient machine operation and quicker bottle handling without appreciable wear and tear on the machine parts.

Hereinabove it was pointed out that the limit valve LV–12 was actuated when the bottom of the bottles was approximately four inches above the case bottom wall. The time delay valve TDV–1 is provided to delay the opening of the grippers momentarily so that normally the carrier will continue its descent after actuation of LV–12, and the grippers will not open until the bottles are almost to the bottom of the case. However, if after actuation of valve LV–12 a bottle should strike on obstruction within a case, retarding or stopping the movement of the carrier 22 downwardly into the case, the gripper jaws would nevertheless be caused to open at the expiration of TDV–1, and the bottles would be deposited in the case. Thus if the caseload of bottles enters into the case a predetermined distance, they will be deposited irrespective of the fact that one of them may strike an obstruction in the case which prevents the bottles being lowered completely into the case.

What is claimed is:

1. An article handling machine comprising, in combination: a case supporting station; an article accumulating station; article carrier means laterally spaced from said accumulating station and vertically spaced above said case supporting station; an article conveyor in article discharge relation with said accumulating station; said accumulating station including stationary article support means and movable article support means each capable of independently supporting articles, said movable support shiftable in a transfer movement to deliver articles to said carrier for pickup thereby and in a return movement in a path spaced below said stationary support means of the accumulating station; stop means interposed between said conveyor and said accumulating station shiftable between article stop and article release positions; and control means responsive to the presence of articles in the accumulating station to shift the stop means to said stop position and initiate transfer movement of said movable support, and responsive to transfer of such articles to a position for pickup by the article carrier to shift the stop means to said release position permitting successive article entry into the accumulating station prior to and independently of the return movement of said movable support.

2. The invention as defined in claim 1 characterized in that said stationary article support means and said movable article support means each comprises a series of elongate spaced-apart article supporting members, with the members of the movable support being interleaved with the members of the stationary support in said accumulating station.

3. The invention as defined in claim 2 characterized in that each of said movable support members includes an upwardly extending portion adjacent one end thereof adapted to engage articles upon transfer movement of the support and maintain article alignment during such transfer movement.

4. The invention as defined in claim 1 characterized in that said movable support means is slidably mounted for transfer movement in track means, said track means mounted for pivotal movement about a horizontal axis spaced from said carrier on the side thereof remote said accumulating station, and motive means are connected to said support for reciprocating the same along said track means and for limitedly pivoting the track means on said axis.

5. The invention as defined in claim 4 characterized in that said motive means comprises a first motive means for shifting said support along said track and a second motive means for pivoting the track about said axis.

6. The invention as defined in claim 5 characterized in that said first and second motive means are each fluid pressure operated cylinders mounted in said machine, one cylinder having an extendible piston rod connected to said movable support, and the other cylinder having an extendible piston rod connected to said track means.

7. The invention as defined in claim 1 characterized in that said article carrier means comprises a stationary support and a movable carrier, and motive means mounted on said support for shifting the carrier to deposit articles in cases, said carrier including a supporting member connected to said motive means and an article gripping assembly releasably, removably coupled to said supporting member for removal and replacement of said assembly.

8. The invention as defined in claim 1 characterized in that said carrier supporting member is provided at opposite ends with clevis portions, and said article gripping assembly includes a pair of spaced-apart projecting bars removably receivable within said clevis portions, and pin means for retaining the bars within the clevis portions.

References Cited

UNITED STATES PATENTS

| | | | |
|---|---|---|---|
| 2,834,167 | 5/1958 | Loveridge | 53—61 |
| 2,898,715 | 8/1959 | Cella | 53—62 |
| 2,898,716 | 8/1959 | Cella | 53—62 |
| 3,021,656 | 2/1962 | DeVries | 53—248 |
| 3,123,956 | 3/1964 | Fisher | 53—61 X |
| 3,250,371 | 5/1966 | Cella | 53—61 X |
| 3,273,308 | 9/1966 | Hoette | 53—248 X |
| 3,302,370 | 2/1967 | Van Luxemborg | 53—248 |
| 3,307,328 | 3/1967 | Rowe Kamp | 53—247 |
| 3,335,542 | 8/1967 | Van Luxemborg | 53—247 |
| 3,340,677 | 9/1967 | Van Luxemborg | 53—247 |
| 3,369,339 | 2/1968 | Speiser | 53—247 X |
| 3,386,224 | 6/1968 | Shuttleworth | 53—77 X |

WAYNE A. MORSE, JR., *Primary Examiner.*

U.S. Cl. X.R.

53—62, 77, 247